United States Patent

Cava

[11] Patent Number: 5,923,524
[45] Date of Patent: *Jul. 13, 1999

[54] DIELECTRIC MATERIAL COMPRESSING TA$_2$O$_5$ DOPED WITH TIO$_2$ AND DEVICES EMPLOYING SAME

[75] Inventor: Robert Joseph Cava, Bridgewater, N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/767,153

[22] Filed: Dec. 16, 1996

Related U.S. Application Data

[63] Continuation of application No. 08/491,436, Jun. 16, 1995, abandoned.

[51] Int. Cl.[6] .................................................. H01G 4/06
[52] U.S. Cl. ...................... 361/321.4; 361/305; 361/311; 361/320; 361/321.1; 361/322; 428/698; 428/426
[58] Field of Search ..................... 361/301.1, 303–305, 361/306.1, 311–312, 320, 500, 528–534, 538, 321.1–321.6, 322; 428/698, 426, 336, 432, 469, 472, 688, 689; 437/34

[56] References Cited

U.S. PATENT DOCUMENTS 4,734,340  3/1988  Saito et al. .............................. 428/698

OTHER PUBLICATIONS

Umezawa et al. "Thin Electrical Properties of Resistive and Dielectric Thin Films Prepared by Reactive Sputtering from a Tantalum–Titanium Composite Target"., Thin Solid Films 52 (1978) 69–75, 1978.

Fujikawa et al., "Effects of Additive Elements on Elec Prop of Tantalum Oxide Films", Journal of Applied Physics, 75 (5), pp. 2538–2544, Mar. 1994.

*Primary Examiner*—Leo P. Picard
*Assistant Examiner*—Phuong T. Vu
*Attorney, Agent, or Firm*—Mathews, Collins, Shepherd & Gould, P.A.

[57] ABSTRACT

Applicant has discovered that the dielectric constant of Ta$_2$O$_5$ can be significantly enhanced by the addition of small quantities of TiO$_2$. Specifically, if Ta$_2$O$_5$ is doped with more than about 3 mole percent of TiO$_2$ the doped material will have a dielectric constant higher than the undoped material. For example, at a ratio of 0.92 Ta$_2$O$_5$:0.08TiO$_2$, the dielectric constant is enhanced by a factor of more than three. Because both Ta and Ti are compatible with current microelectronics processing, the new dielectric can be used to make capacitors of reduced size with but minor modifications of conventional processes.

10 Claims, 3 Drawing Sheets

DIELECTRIC MATERIAL COMPRESSING TA$_2$O$_5$ DOPED WITH TIO$_2$ AND DEVICES EMPLOYING SAME

This application is a continuation of application Ser. No. 08/491,436, filed Jun. 16, 1995, now abandoned.

FIELD OF THE INVENTION

This invention relates to dielectric materials and, in particular, to dielectric materials comprising Ta$_2$O$_5$ doped with TiO$_2$ to enhance their dielectric constants. These materials are particularly useful for providing dielectric layers in capacitors.

BACKGROUND OF THE INVENTION

As microelectronic circuits become increasingly integrated, the demand for smaller components becomes stronger. For the capacitive components, the materials presently employed have inadequate dielectric constants to be used with lower area. To remedy this problem, exotic high dielectric constant materials such as Barium Strontium Titanate (BST) are presently in the research stage in many laboratories, especially for their potential use in DRAM applications. Such materials, however, invariably require the use of chemical elements foreign to the usual microelectronics manufacturing procedures and therefore require alteration of manufacturing processes and extensive compatibility testing. Accordingly, there is a need for a new improved dielectric material compatible with conventional microelectronic processing.

SUMMARY OF THE INVENTION

Applicant has discovered that the dielectric constant of Ta$_2$O$_5$ can be significantly enhanced by the addition of small quantities of TiO$_2$. Specifically, if Ta$_2$O$_5$ is doped with more than about 3 mole percent of TiO$_2$ the doped material will have a dielectric constant higher than the undoped material. For example, at a ratio of 0.92 Ta$_2$O$_5$:0.08TiO$_2$, the dielectric constant is enhanced by a factor of more than three. Because both Ta and Ti are compatible with current microelectronics processing, the new dielectric can be used to make capacitors of reduced size with but minor modifications of conventional processes.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

Applicant has found that the dielectric constant of Ta$_2$O$_5$ is enhanced by small quantities of TiO$_2$ dopant. It was determined that the dielectric constant K of (Ta$_2$O$_5$)$_{1-x}$(TiO$_2$)$_x$ exceeds that of undoped Ta$_2$O$_5$ for $x \leq 0.03$. K is doubled over the approximate range $0.05 < x < 0.15$, and it achieves a maximum of more than three times the undoped value at $x \approx 0.08$. The remaining discussion is divided into three parts. Part A describes preparation of the bulk material. Part B describes its properties, and Part C shows its use in making improved capacitors.

A. Material Preparation

In a series of experiments, ceramic samples in the Ta$_2$O$_5$—TiO$_2$ chemical system were made by standard ceramic processing techniques. High purity tantalum oxide and titanium oxide were first mixed in a predetermined molar ratio, mechanically ground, and fired for several nights in dense Al$_2$O$_3$ crucibles in air between 1350 and 1400° C. with intermediate grinding. The powders were then pressed into 0.5 inch diameter pellets approximately 0.125 inch thick and fired in air on powder of their own composition for 16–24 hours at 1400° C. They were cooled to 100° C. at 200° C./hr. before the furnace was turned off.

B. Properties

Surfaces of the pellets were then sanded smooth and 1:1 mole ratio Ga:In alloy solder electrodes were applied. Measurements of the dielectric constants and dissipation factors were then made at 1 MHz and 100 KHz using an HP4192A impedance analyzer. The data for the 1 MHz measurements is summarized in Table 1. The dielectric constant, dissipation factor, total variation in dielectric constant, and temperature coefficient of dielectric constant (TCK) in a −20 to 60° C. temperature range are tabulated for each composition studied.

TABLE 1

Dielectric Properties of Bulk Polycrystalline Ta$_2$O$_5$—TiO$_2$ Ceramics Measured at 1 MHz

| Composition | | K† at | D‡ at | Total Change in K(%) | TCK* |
|---|---|---|---|---|---|
| Ta$_2$O$_5$ | TiO$_2$ | 20° C. | 20° C. | −20 to +60° C. | ppm/° C. |
| 1.00 | 0.00 | 35.4 | 0.006 | +4.8 | 600 |
| 0.98 | 0.02 | 20.3 | 0.016 | +7.6 | 950 |
| 0.96 | 0.04 | 46.6 | 0.038 | +20.6 | 2580 |
| 0.94 | 0.06 | 94.0 | 0.016 | +22.5 | 2810 |
| 0.92 | 0.08 | 126.2 | 0.010 | +23.4 | 2930 |
| 0.90 | 0.10 | 97.8 | 0.026 | +24.3 | 3040 |
| 0.875 | 0.125 | 88.6 | 0.008 | +16.9 | 2110 |
| 0.85 | 0.15 | 69.1 | 0.008 | +13.0 | 1620 |
| 0.80 | 0.20 | 59.4 | 0.009 | +11.4 | 1420 |
| 0.70 | 0.30 | 57.6 | 0.021 | +12.1 | 1510 |
| 0.60 | 0.40 | 42.2 | 0.009 | +9.7 | 1210 |

†K = dielectric constant
‡D = dissipation factor (=tan δ)
*TCK = temperature coefficient of dielectric constant
   = total change in K. (in ppm)/80° C.

Figure 1:
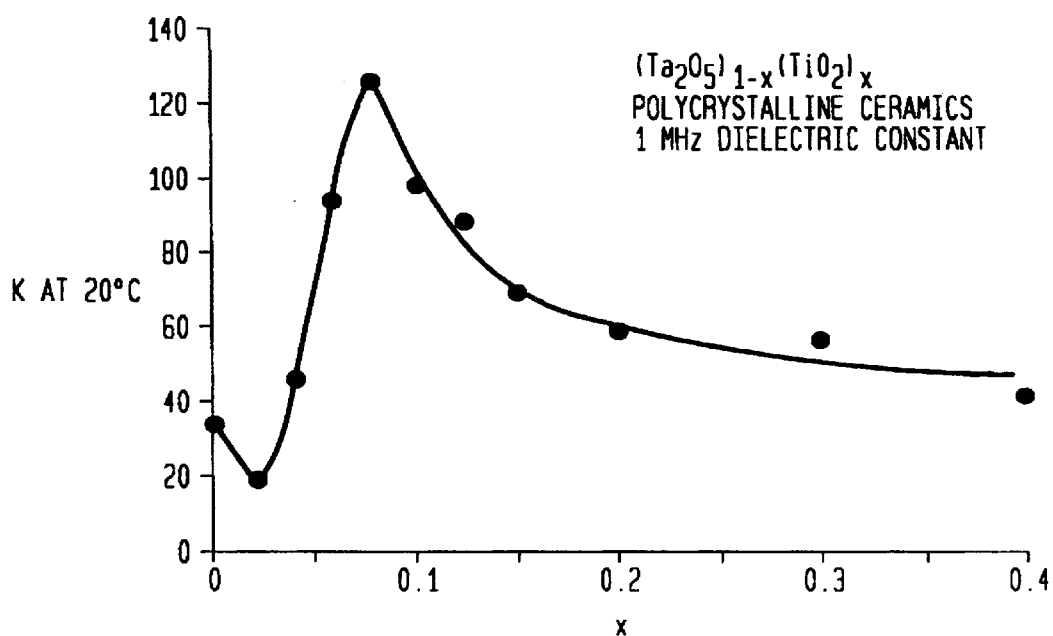
FIG. 1 is a graphical illustration of the dielectric constant at 1 MHz of (Ta$_2$O$_5$)$_{1-x}$(TiO$_2$)$_x$ at 20° C.

FIG. 1 plots the dielectric constant K at 1 MHz and 20° C. for various compositions of (Ta$_2$O$_5$)$_{1-x}$(TiO$_2$)$_x$. As can be seen, K drops for low level doping of TiO$_2$ less than about 3 mole percent and thereafter increases over that of the undoped material. The greatest enhancement of K occurs at compositions between 5% TiO$_2$ and 15% TiO$_2$ where K more than doubles. The graph shows a strong peak of K=126 at about 8% TiO$_2$ doping. As the TiO$_2$ component increases beyond about 40% it becomes increasingly difficult to form films of the material with enhanced properties. Similar behavior was observed at 100 KHz.

Figure 2:
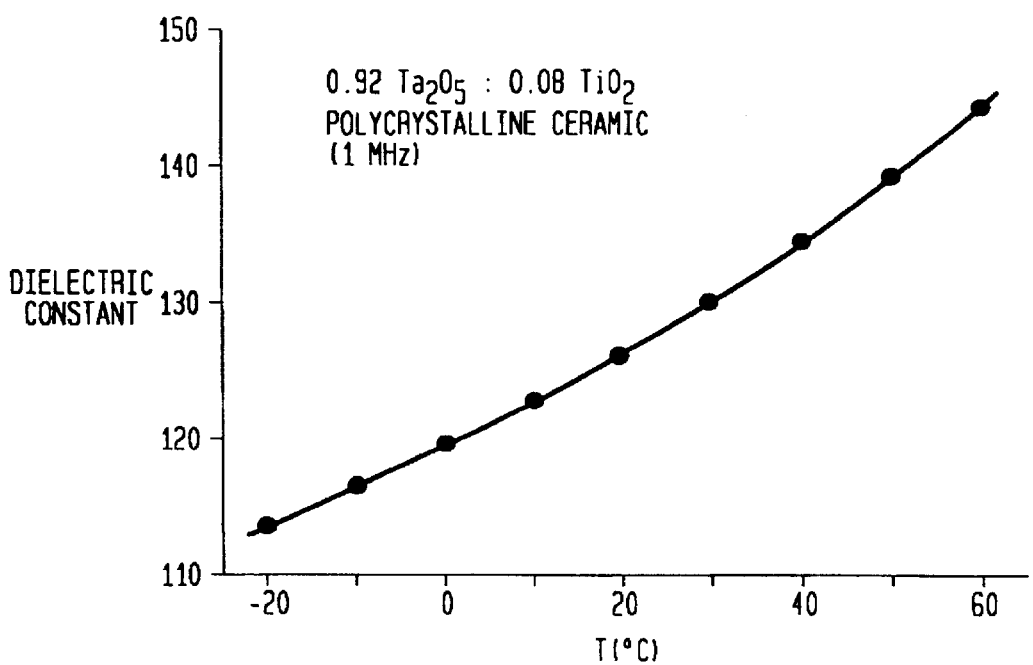
FIG. 2 is a graphical illustration of the dielectric constant at 1 MHz of (Ta$_2$O$_5$)$_{0.92}$(TiO$_2$)$_{0.08}$ at various temperatures.

FIG. 2 plots the temperature dependent dielectric constant for a 0.92 Ta$_2$O$_5$:0.08 TiO$_2$ polycrystalline pellet. The increased dielectric constant that results from $TiO_2$ doping of $Ta_2O_5$ is accompanied by a significant increase in TCK.

Figure 3:
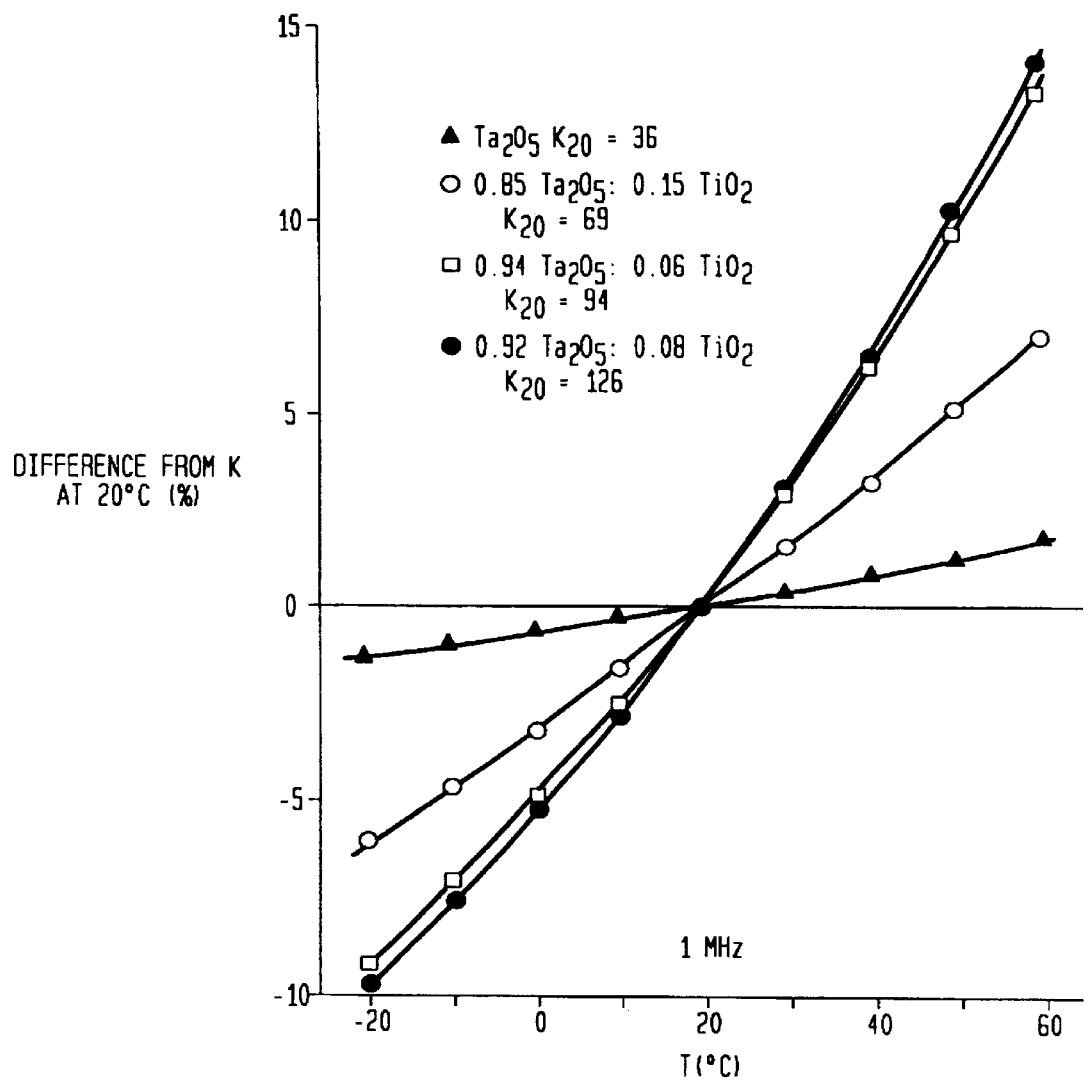
FIG. 3 shows the variation of the dielectric constant with temperature for several different compositions of doped Ta$_2$O$_5$.

FIG. 3 plots the temperature variation of K for several compositions. The graph shows that materials near the highest K have similar TCKs. It also shows that an enhancement of the dielectric constant by a factor of 2 over $Ta_2O_5$ with lower TCK than the 0.92:08 material is possible for compositions near 85% $Ta_2O_5$. The composition region between approximately 94 and 88% $Ta_2O_5$ yields the best materials if the value of K is the primary consideration.

Characterization of the materials by conventional powder X-ray diffraction (CuK x-radiation) showed that the enhanced dielectric constant for 8%–15% $TiO_2$ doping is associated with the presence of the H' monoclinic $Ta_2O_5$ solid solution phase. Thus the $TiO_2$ doping resulted in the formation of a crystallographic phase different from that obtained in pure $Ta_2O_5$.

Table 1 also shows the values of the dielectric dissipation (D) at 1 MHz. Unlike the other dielectric data, the D values do not systematically change with composition. This suggests that the loss values are dominated by uncontrolled parameters in the present processing procedure, such as the presence or absence of oxygen vacancies, well known to occur in titanium based oxides. In any case the dissipation factor measured for the 0.92:0.08 composition is not more than a factor of 2 higher than that for pure $Ta_2O_5$, and may actually be of the same magnitude as that of $Ta_2O_5$ in properly processed materials, as is suggested by the lower D values for other materials in the table.

C. Exemplary Device Application

Figure 4:
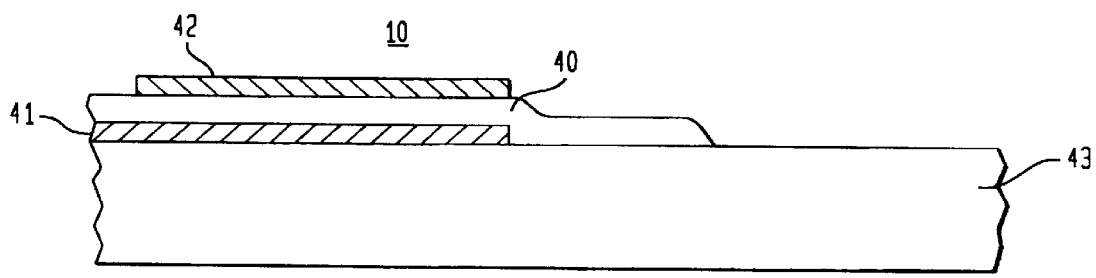
FIG. 4 is a schematic cross section of a capacitor comprising a dielectric layer of Ta$_2$O$_5$ doped with TiO$_2$.

FIG. 4 is a schematic cross section of a capacitor 10 comprising a dielectric layer 40 of $TiO_2$ doped $Ta_2O_5$ disposed between a pair of electrodes 41 and 42. In preferred applications electrode 41 is supported on a substrate 43 containing other microelectronic components (not shown) and layer 40 is preferably $(Ta_2O_5)_{1-x}(TiO_2)_x$ where $0.03 \leq x \leq 0.4$ and preferably $0.05 \leq x \leq 0.15$. A thin film of the dielectric can be deposited on electrode 41 from the bulk material by conventional sputtering or laser ablation processes. Preferred electrodes can be made of doped polysilicon. The advantage of using this dielectric material is that because of its enhanced dielectric constant, the area on the substrate consumed by the capacitor can be reduced, thereby permitting a higher density of components. Use of material with $x \approx 0.08$ permits the same capacitance in one-third the area as that for $x=0$.

It is to be understood that the above-described embodiments are illustrative of only a few of the many possible specific embodiments of the invention. Numerous and varied other arrangements can be made by those skilled in the art without departing from the spirit and scope of the invention.

The invention claimed is:

1. A dielectric material comprising $(Ta_2O_5)_{1-x}(TiO_2)_x$ and having an H' $Ta_2O_5$ crystalline solid solution phase, where $0.05 \leq x < 0.10$ and the dielectric constant of said material measured at 20° C. and 1 MHz is greater than 100.

2. A capacitor comprising a pair of conductive electrodes and, disposed between said electrodes, a layer of $(Ta_2O_5)_{1-x}(TiO_2)_x$ where $0.05 \leq x < 0.10$ and the dielectric constant of said material in bulk polycrystalline form measured at 20° and 1 MHz is greater than 100.

3. A capacitor comprising a pair of electrodes and a dielectric material disposed between the electrodes, the capacitor being produced by depositing the crystalline dielectric material of claim 1 on an electrode by sputtering or laser ablation.

4. The dielectric material of claim 1 comprising a monoclinic crystal system.

5. A capacitor comprising a pair of conductive electrodes and, disposed between said electrodes, a layer of $(Ta_2O_5)_{1-x}(TiO_2)_x$ where $0.05 \leq x \leq 0.4$.

6. The capacitor of claim 3 wherein x is 0.08.

7. A dielectric material comprising $(Ta_2O_5)_{1-x}(TiO_2)_x$ and having an H' $Ta_2O_5$ crystalline solid solution phase, where $0.05 \leq x < 0.15$ and the dielectric constant of said material measured at 20° C. and 1 MHz is greater than 100, the material being produced with processing temperatures of greater than 1300° C. to achieve the H' crystalline phase.

8. The dielectric material of claim 7, the material being produced in bulk form with temperatures of about 1350° C. to 1400° C. to achieve the H' crystalline phase.

9. A capacitor comprising a pair of electrodes and a dielectric material disposed between the electrodes, the capacitor being produced by depositing the crystalline dielectric material of claim 8 on an electrode by sputtering or laser ablation.

10. A device comprising a dielectric material wherein the material comprises $(Ta_2O_5)_{1-x}(TiO_2)_x$ having an H' monoclinic $Ta_2O_5$ crystalline solid solution phase, where $0.05 \leq x < 0.10$ and the dielectric constant of said material measured at 20° C. and 1 MHz is greater than 100.

* * * * *

UNITED STATES PATENT AND TRADEMARK OFFICE
CERTIFICATE OF CORRECTION

PATENT NO. : 5,923,524
DATED : July 13, 1999
INVENTOR(S) : Robert Joseph Cava

It is certified that error appears in the above-identified patent and that said Letters Patent is hereby corrected as shown below:

On the title page, item [54] and column 1, line 3, change "COMPRESSING" to --COMPRISING--.

Signed and Sealed this

Twenty-third Day of November, 1999

Attest:

Q. TODD DICKINSON

Attesting Officer

Acting Commissioner of Patents and Trademarks